United States Patent [19]

Langecker

[11] 4,035,466

[45] July 12, 1977

[54] METHOD FOR CENTRAL INJECTION MOLDING

[76] Inventor: Erhard Langecker, Hohbuschener Weg 5, D-5882 Meinerzhagen 1, Germany

[21] Appl. No.: 640,443

[22] Filed: Dec. 15, 1975

Related U.S. Application Data

[63] Continuation-in-part of Ser. No. 399,960, Sept. 24, 1973, abandoned.

[30] Foreign Application Priority Data

Sept. 27, 1972 Germany .......................... 2247995

[51] Int. Cl.² ........................................ B28B 1/124
[52] U.S. Cl. ............................... 264/328; 264/245; 264/255

[58] Field of Search .................... 264/245, 255, 328

[56] References Cited

U.S. PATENT DOCUMENTS

| 3,339,240 | 9/1967 | Corbertt | 18/30 |
| 3,513,060 | 5/1970 | Krystof | 161/5 |
| 3,793,415 | 2/1974 | Smith | 264/45 |

Primary Examiner—Lester L. Lee
Attorney, Agent, or Firm—Andrew R. Basile

[57] ABSTRACT

An injection molding nozzle and a method for using the same for the central injection molding of thermoplastic materials consisting of a filling compound of any desired thermoplastic material and a surrounding cover layer consisting of a different thermoplastic composition.

3 Claims, 5 Drawing Figures

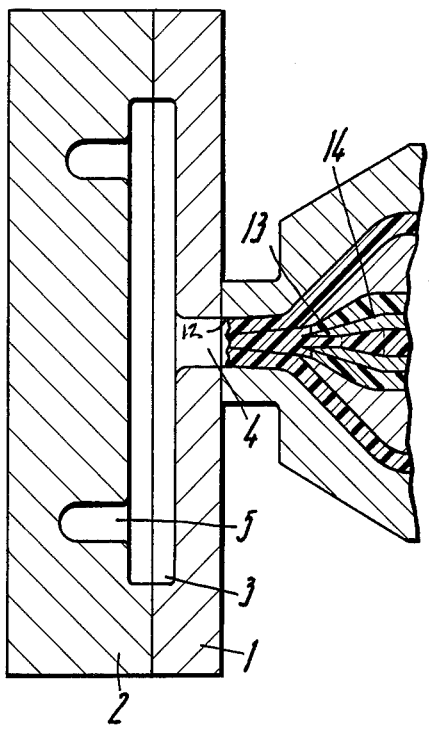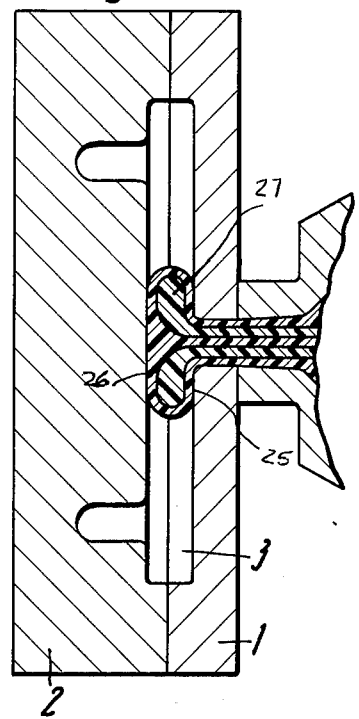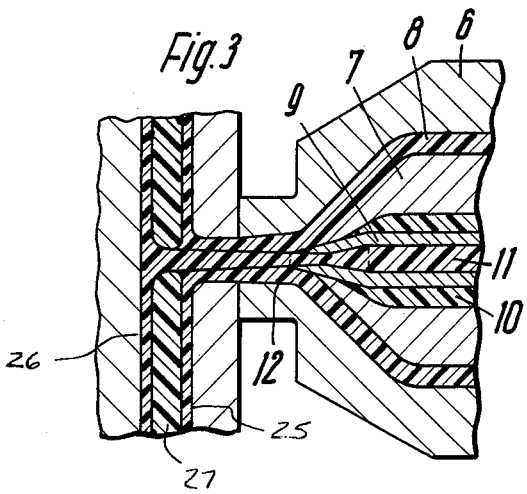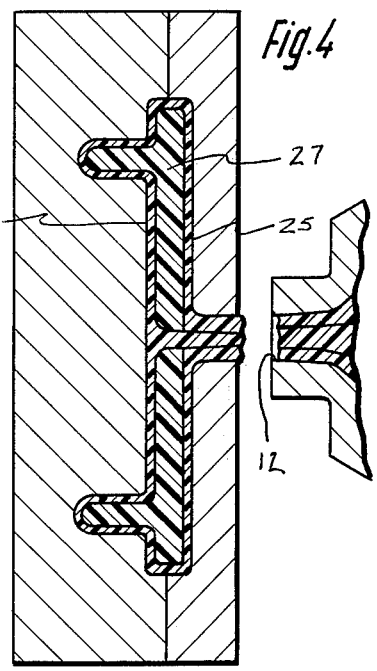

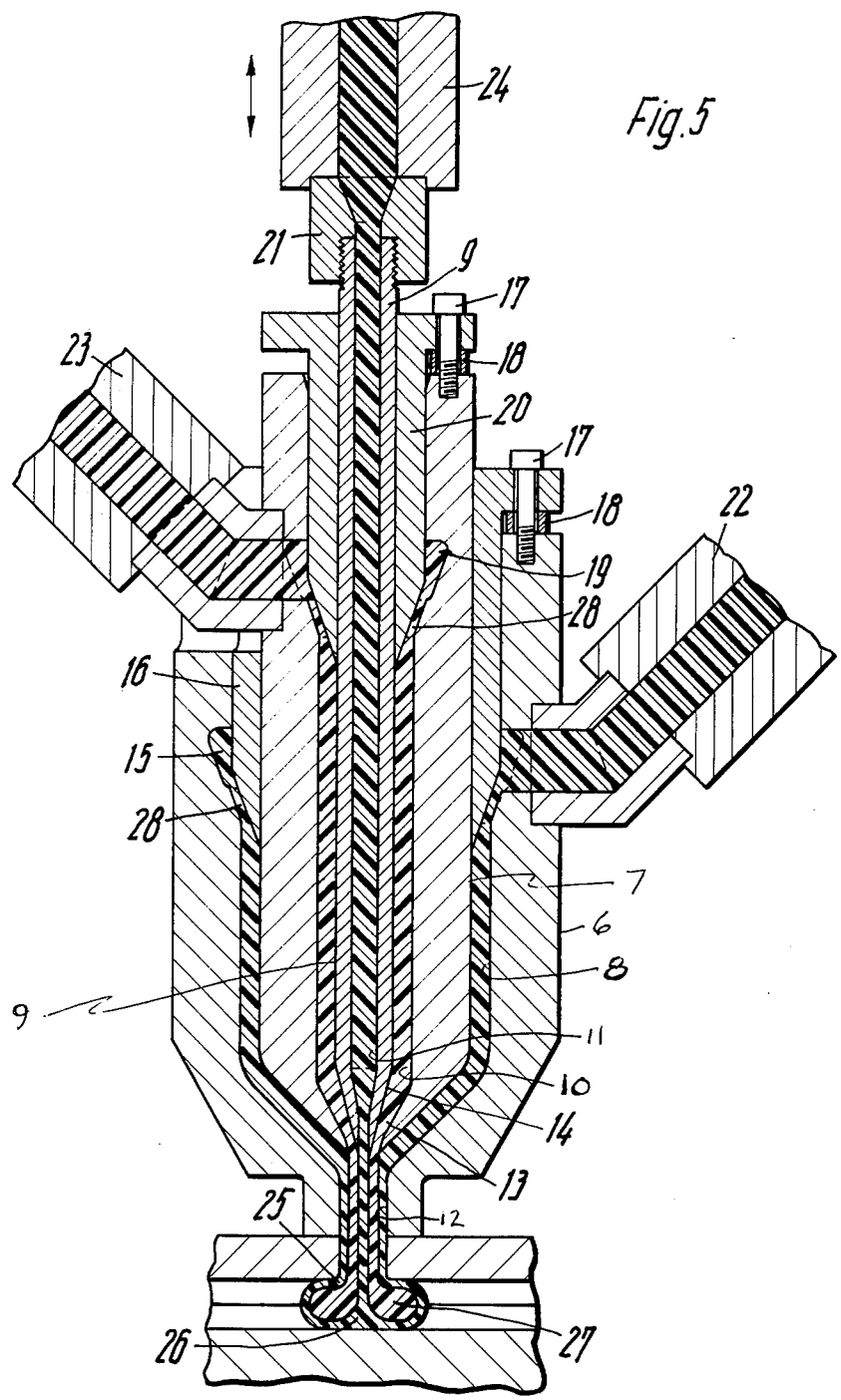

METHOD FOR CENTRAL INJECTION MOLDING

CROSS REFERENCE TO RELATED APPLICATIONS

The present application is a continuation-in-part application of co-pending U.S. Pat. application Ser. No. 399,960 filed Sept. 24, 1973, and now abandoned, which, in turn, claims the priority of West German Patent Application P 22 47 995.4-16 filed Sept. 27, 1972.

BACKGROUND OF THE INVENTION

I. Field of the Invention

The present invention relates generally to injection molding and, specifically, to a molding nozzle and method of forming molded plastic bodies which consist of a filling compound and a surrounding cover layer, both of which are of different thermoplastic compositions.

II. Description of the Prior Art

Methods for the manufacture of molded laminated plastic materials are well known wherein a thermoplastic material which forms a cover layer is first injected into the mold to be followed by a second injection molding step, during which the plastic which is to form a filling compound is injected into the mold. This procedure, which consists of two separate sequential injection steps, suffers from the disadvantage that there is a danger that the plastic injected as the filling component may rupture the plastic which is intended as the cover layer component. This danger is especially great when the amount of cover layer component injected is not sufficient. In such an event, the object of producing a molded article which is completely encased in a contiguous cover layer cannot be achieved.

In order to achieve these disadvantages, it has been proposed to initially inject only part of the cover material into the mold, to be subsequently followed by an injection of a combination of the filling material together with additional cover material. This method, which is a previously unpublished proposal, is only successful in producing flawless laminated products if the injection molding is not done centrally, but rather by a lateral approach, since under such conditions the plastic which forms the cover layer can distribute itself uniformly over the opposing internal sides of the mold and, thus, can result in a contiguous cover layer of uniform thickness. For the case of a centrally located injection port which results in injection vertically to the internal mold surfaces, the above-mentioned method does not result in a uniform contiguous cover layer. This is due to the fact that the cover layer plastic, which is injected together with the filling component plastic and surrounds it, will only reach the internal mold surface which faces the injection port of the one mold-half, but does not reach the opposing internal mold surface of the other mold-half. This results in a substantially reduced thickness for the cover layer on the surface which is turned away from the injection port, in comparison with the cover layer of the surface adjoining the injection port. In order to prevent rupturing of the cover layer on the side turned away from the injection port, a correspondingly larger port of the cover layer material has to be injected, before the simultaneous injection of cover layer material and filler material can be done. Nevertheless, the danger persists, that the plastic, injected vertically onto the interior mold surface which is turned away from the injection port, will penetrate the cover layer and rupture it, resulting in reject products.

SUMMARY OF THE INVENTION

The present invention, which will be described hereinafter in greater detail, comprises an injection molding nozzle and a method which allows for the central injection molding of laminated molded articles which are characterized by the fact that the covering layer, which envelops the filling compound, is contiguous and of uniform thickness over its total range.

This is achieved, according to the present invention, through an arrangement whereby the plastic forming the cover layer is injected in the form of a central strand of material and also in the form of an annular strand which surrounds the center strand at a certain distance, whereas the plastic forming the filling component is injected through the annular area located between the strands of plastic forming the cover layer. Furthermore, the supply of the plastic forming the filling component is interrupted prior to the completion of the injection step in such a manner and at the location where both plastics come together that a plug representing the sprue of the injection molded article, as well as the plug remaining in the injection nozzle, consists of the cover layer plastic.

During the simultaneous injection of the cover layer plastic and the filling compound plastic, the plug remaining in the injection nozzle, consisting of cover layer plastic, is introduced into the mold. This results in the fact that the plastic cover layer plastic introduced through the central strand will reach the internal mold surface which lies opposite to the injection port. At the same time the cover layer plastic, which is fed via the annular strand, will reach the internal mold surface which is adjoining to the injection port. Thus, for the case of simultaneous injecton of cover layer plastic and filling compound plastic, the filling compound always is enclosed by two uniformly expanding cover layers which are of uniform thickness. This results in a laminated molded article which is completely enclosed by a cover layer which is contiguous and of uniform thickness. Since the cover layer plastic is fed simultaneously to the two opposite internal mold surfaces, the danger of penetration of the cover layer by the filling compound is positively excluded. By interrupting the feed of the filling compound plastic prior to the completion of the injection process and by doing so at the location where the two materials come together, positive assurance is provided that the residual material left in the injection channel and the nozzle mouth will be cover layer plastic. Thus, the injection molded laminated article is covered even at the sprue location with the proper cover layer material. Simultaneously, the plug of material remaining in the injection nozzle provides for flawless injection of the next following laminated article. Injection of the central strand and the annular strand of cover layer material may be from the same extruder.

A further characteristic of the process of the present invention is given by the possibility that the central strand cover layer material may be of a different composition and/or color than the cover layer material of the annular strand. Since the central strand and the annular strand of the plastic forming the layer may also be separately injected, each from its own extruder, this possibility is given to use two different plastics, one for each strand, which may be distinct in either composition or color. Thus, laminated articles can be produced with cover layers of different properties or colors on opposite sides of the finished molded article.

The injection nozzle used for carrying out the inventive method is characterized by the fact that an external sleeve is provided which tapers down to a conical ring nozzle opening, inside of which is an internal sleeve so arranged that the two sleeves join together in an annular exit slot. In the internal sleeve a drilled hole is provided which tapers off to a conical nozzle opening that serves as an exit. In the drilled hole a coaxially, movable cylinder is arranged which forms an internal annular channel that terminates in a valve cone. The exterior annular channel, the internal annular channel, and the cylinder are connected to plasticizing extruders. Th cylinder provided for in the internal sleeve, on respective axial movement, will close off the annular channel by which the filling compound plastic material is supplied, so that further supply of this plastic may be reliably interrupted before completing the injection step. On initiating a new injection sequence, this blockage is removed by a respective opposite axial movement of the cylinder, so that again the cover layer plastic is simultaneously injected into the mold with the filling compound plastic. At this point the plug of cover layer material remaining in the injection nozzle assures a uniform distribution of the cover layer material onto both sides of the mold. To this effect, the invention is furthermore characterized by the fact that the volume of the conical ring nozzle is at least equal to the volume of the sprue on the mold.

Finally, it is of importance that, between the exterior sleeve and the interior sleeve on the one hand and between the interior sleeve and the cylinder on the other hand, a bushing is so arranged that it provides, together with the annular groove serving as the supply channel for the plastic, a variable control-slot for the plastic feed.

Other objects, advantages, and applications of the present invention will become apparent to those skilled in the art of injection molding when the accompanying description is read in conjunction with the accompanying drawings.

BRIEF DESCRIPTION OF THE DRAWINGS

The description herein makes reference to the accompanying drawings wherein like reference numerals refer to like components throughout the several views, and in which:

FIG. 1 is a schematic representation of a mold and nozzle showing an initial step of the inventive injection process;

FIG. 2 is a schematic representation similar to FIG. 1 showing an intermediate step of the inventive injection process;

FIG. 3 is a schematic representation similar to FIG. 1 showing the final step of the inventive injection process;

FIG. 4 is a schematic representation similar to FIG. 3 showing the injection nozzle separated from the mold; and FIG. 5 is a cross-sectional view of the inventive injection nozzle shown in a working condition corresponding to FIG. 2.

DESCRIPTION OF THE PREFERRED EMBODIMENTS

Referring now to the drawings and, in particular, to FIGS. 1 through 4 for an example for the present invention wherein a progression of the injection process is illustrated in the form of a mold having a top half section 1 and a lower half section 2. The top half section 1 has a centrally located sprue 4, which leads to a hollow mold cavity 3, formed by the two mold sections 1 and 2. The mold cavity 3 includes two downwardly directed pivot projections 5. During the initial phase of the injection process, as shown in FIG. 1, a conical orifice 12 of an outside sleeve 6 of an injection nozzle is plugged with a residual amount of cover material plastic. Prior to the injection step, by retracting a cylinder 9, an annular slot 13 (FIG. 1) is opened to communicate an annular channel 10 to within the conical orifice 12. The annular channel 10 carries a filling compound plastic. All of the extruders (FIG. 5) are started up, so that simultaneously the cover layer plastic is supplied to the nozzle orifice 12 via a central channel 11 and an outside annular sleeve channel 8, while at the same time the annular space between the central channel 11 and the outer annular sleeve channel 8 carries the filling compound supplied via annular channel 10. Injection takes place in a downward direction (to the left), as shown in FIG. 2.

The plug situated in the nozzle orifice 12 readies the interior surface of the bottom half section 2 of the mold and is distributed as shown in FIG. 2. The central strand of cover material exiting from the central axial channel 11 forms a continuous cover layer 26 on the interior surface of the bottom half section 2, while the plastic being delivered via annular sleeve channel 8 forms a continuous cover layer 25 on the interior surface of the upper half section 1 of the mold. Between these two cover layers the filling compound plastic 27 remains completely enclosed.

As FIGS. 3 and 5 show, prior to completing the injection process, cylinder 9 is pushed into a closed position causing a collar 21 to rest on the face surface of bushing 20 in order to protect the conical exit valve opening 14 from damage. This causes the closing of annular channel 10, which carries the filling component plastic, exactly at the location where the two different plastics come together, so that now only the central strand exiting from opening central channel 11 and the annular strand exiting from the outer annular sleeve channel 8 are continued to be injected, so that the sprue 4 and the conical annular nozzle orifice 12 are filled with cover layer plastic only, as shown in FIG. 3. After removal of the injection nozzle orifice 12, as per FIG. 4, it contains a plug of cover layer plastic which, at the beginning of the next injection cycle, is introduced into the mold, as hereinbefore described with respect to FIG. 1.

FIG. 5 illustrates a cross-sectional view of the injection nozzle. It consists of the outer sleeve 6, in which the interior sleeve 7 is mounted, forming an annular space between the two. The distance between the exterior sleeve 6 and the interior sleeve 7 forms the annular sleeve channel 8 for the cover layer plastic. The interior sleeve 7 contains an axial passage which at the lower end thereof tapers down to the conical exit opening 13. Inside the passage of the interior sleeve 7, the cylinder 9 is mounted, forming an annular space which defines the annular channel 10. The cylinder 9 is axially movable and tapers down at its lower end to the conical end 14, which serves as a valve. A downward axial movement of the cylinder 9 results in the valve 14 closing the annular channel 10 which is formed by the interior sleeve 7 and cylinder 9 and which, as aforementioned, carries the supply of filling compound plastic. The cylinder 9 has a bore hole passage 11 that is the supply channel for the central strand and is fed with the cover material plastic from an extruder 24. The external sleeve 6 tapers down into the conical exit orifice 12 where, during the injection process, the central strand exiting from bore hole passage 11, as well as the annular strand exiting from annular sleeve channel 8, both forming the cover layer, and also the plastic used as filling component and exiting via annular channel 10, are combined into one strand of material, in which the filling component plastic is encircled between the central strand from bore hole passage 11, and the annular strand from annular sleeve channel 8.

A bushing 16 is installed between the exterior sleeve 6 and interior sleeve 7. The interior side of interior sleeve 6 has an annular channel 15 into which the cover material plastic from extruder 22 is fed for communication with the annular sleeve channel 8. Bushing 16, together with the interior surface of the outside sleeve 6, forms an annular slot 28, which can be dimensionally varied by axial movement of bushing 16 by means of a screw 17 and a washer 18. A second axially movable bushing 20 is located between the interior sleeve 7 and cylinder 9. The interior surface of interior sleeve 7 has an annular channel 19, which is supplied via extruder 23 with the plastic used as the filling component. In this case, too, an annular slot 28 is provided, which can be dimensionally varied by means of a second screw 17 and washer 18.

These control possibilities provide for the possibility of guaranteeing a uniform flow of plastic material, both through annular channel 10 and annular channel 8. Cylinder 9 can be moved in axial direction by means not represented in the drawing. To this effect, it is provided with a stop 21, which in the closed position of cylinder 9 rests on the upper face surface of bushing 20. Bore hole passage 11 of cylinder 9 is extruder-fed with the cover layer plastic from the extruder 24.

It is a precondition to the practice of the procedure that the plastics used for the cover layer and the filler layer must be compatible with each other. The use of different plastics for the inside and outside of the cover layer furthermore necessitates that these plastics heat seal to each other by fusion, so that a seamless, continuous cover layer is produced.

In principle, all those plastics can be processed by the instant procedure which are capable of being injection molded, as long as the above preconditions are met. Analogous to injection molding processes to prepare molded articles from a single plastic, the processing temperatures and pressures used for the thermoplastic materials depend essentially on the shape of the molded article (thin-or-thick-walled) to be produced. The same holds for the injection rate to be used. For a thick-walled article with a longer flow distance, a higher injection pressure and a higher injection rate are required.

For the filler layer it is not inherently a requirement that a foamable plastic be used; it is quite within the scope of the procedure to use the same material as is used for the cover layer. In this case the filler layer material may be less costly because it is recycled scrap material which has been reground; for instance, it may be of a different color than the cover layer material, or again it may be a granulate consisting of several different colors. For economic reasons there may be a desire in this case to provide the article with an optimally thin cover layer. To this effect, a higher temperature which increases the flowability would be used for the cover layer, as well as a lower injection pressure, in comparison with the parameters used for the filler layer material. This would result in a thick filler layer and a thin cover layer.

When different plastics are used for the cover layer and the filler layer, the objective of arriving at a thin cover layer would be achieved by using a material with higher flowability for this purpose and a material with lower flowability for the filler layer. Of course, the opposite would apply should a thick cover layer and a thin filler layer be the desired objective.

For the procedure according to the invention, primarily plastics based on polystyrene and acrylic-butadiene-styrene based plastics are the primary materials of choice. However, other plastics, i.e. polypropylene, polyethylene, etc., may also be used, just as these are used in conventional injection molding procedures. For instance, the filler layer may consist of polystyrene and the cover layer of acrylic-butadiene-styrene, or vice versa. Similarly, polypropylene and polyethylene may be processed together, since both these materials will fuse with each other in the heated state.

The processing temperature for these materials is between 220° C and 250° C. As previously stated, the material forming the cover layer must not necessarily have the same degree of flowability as the filler layer material. The material with the higher flowability results in a thinner cover layer, while material with a lesser degree of flowability results in a thicker cover layer.

EXAMPLE

To produce a round container, polystyrene is used for the cover layer and is injected at a temperature of 250° C and with a pressure of 1000 bar, meanwhile for the filler layer a foamable polystyrene is injected at a temperature of 230° C and at a pressure of 1100 bar. The finished article is characterized by a thick internal filler layer, covered on both sides with thin cover layers.

Having described and illustrated the invention in some detail, it will be understood that this description and illustrations are offered only by way of example, and that other forms of the invention may be had, all coming within the spirit of the invention and scope of the appended claims.

What is claimed is as follows:

1. In a method for the central injection molding of plastic bodies of the type comprising a filling component of any suitable thermoplastic material, and of a cover layer which encloses said filling component and comprises another thermoplastic material, the thermoplastic materials must be compatible and have substantially the same viscosity, the improvement which comprises injecting into a mold through a nozzle the plastic forming the cover layer in the form of a central strand of material;

injecting into the mold in the form of an annular strand of the same material;

the annular strand encircling the first central strand at some distance to define an annular space;

injecting the filling component plastic into the mold through the annular space between the cover layer strands; and interrupting the feed of the filling component plastic before completing the injection step in such a manner, where all the plastics come together, that the sprue of the injection molded body, as well as the plug remaining in the nozzle, consists only of cover layer plastic.

2. The method defined in claim 1 wherein the plastic material supplied via the central strand of cover layer material is of different composition and/or color than the annular strand of material forming the cover layer.

3. In a method for central injection molding of plastic bodies of the type comprising a filling component of a thermoplastic material and a cover layer which encloses said filling component and comprises a different thermoplastic material, the thermoplastic materials must be compatible and have substantially the same viscosity, and wherein the cover layer is contiguous the improvement which comprises:

injecting into a mold through a nozzle in the form of a central strand of material, the plastic forming the cover layer;

injecting into the mold through the nozzle an annular strand of the plastic forming the cover layer material;

the annular strand encircling the central strand at a distance to define an annular space;

injecting the filling component plastic through the nozzle into the mold through the annular space between the cover layer strands;

the injection of the cover layer strands and the filling component plastic being simultaneous; and interrupting the feed of the filling component plastic before completing the injection step in such a manner, where all the plastics come together, that the sprue of the injection molded body, as well as the plug remaining in the nozzle, is only cover layer plastic.

* * * * *

UNITED STATES PATENT OFFICE
CERTIFICATE OF CORRECTION

Patent No. 4,035,466          Dated  July 12, 1977

Inventor(s)   Erhard Langecker

It is certified that error appears in the above-identified patent and that said Letters Patent are hereby corrected as shown below:

Column 1, line 37, preceding "these" delete "achieve" and insert --avoid--;

Column 3, line 16, after "extruders." delete "Th" and insert --The--;

Column 5, line 60, after "injection" insert -- pressure and the injection --.

Signed and Sealed this

Eleventh Day of October 1977

[SEAL]

Attest:

RUTH C. MASON
Attesting Officer

LUTRELLE F. PARKER
Acting Commissioner of Patents and Trademarks